(12) United States Patent
Yuhara et al.

(10) Patent No.: US 8,666,975 B2
(45) Date of Patent: Mar. 4, 2014

(54) NAVIGATION DEVICE

(75) Inventors: Hiromitsu Yuhara, Saitama (JP);
Masayuki Habaguchi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/512,571

(22) PCT Filed: Dec. 15, 2010

(86) PCT No.: PCT/JP2010/072542
§ 371 (c)(1),
(2), (4) Date: May 29, 2012

(87) PCT Pub. No.: WO2011/096137
PCT Pub. Date: Aug. 11, 2011

(65) Prior Publication Data
US 2012/0290569 A1 Nov. 15, 2012

(30) Foreign Application Priority Data
Feb. 8, 2010 (JP) ................................ 2010-025906

(51) Int. Cl.
*G06F 7/00* (2006.01)
*G06F 17/30* (2006.01)

(52) U.S. Cl.
USPC ....................................................... 707/724

(58) Field of Classification Search
USPC ................. 701/32.3, 32.4; 707/722, 723, 724
See application file for complete search history.

(56) References Cited

U.S. PATENT DOCUMENTS

| | | | |
|---|---|---|---|
| 2004/0260466 A1* | 12/2004 | Ichihara et al. | 701/209 |
| 2007/0076652 A1* | 4/2007 | Nishiwaki | 370/328 |
| 2007/0156435 A1* | 7/2007 | Greening et al. | 705/1 |
| 2008/0016040 A1* | 1/2008 | Jones et al. | 707/3 |
| 2008/0146157 A1* | 6/2008 | Aaron | 455/66.1 |
| 2008/0201227 A1* | 8/2008 | Bakewell et al. | 705/14 |
| 2008/0215557 A1* | 9/2008 | Ramer et al. | 707/4 |
| 2009/0030599 A1* | 1/2009 | Kawauchi | 701/200 |

(Continued)

FOREIGN PATENT DOCUMENTS

| | | |
|---|---|---|
| EP | 1258707 A2 | 11/2002 |
| EP | 2023090 A2 | 2/2009 |

(Continued)

OTHER PUBLICATIONS

European Search Report issued Jun. 6, 2013, in counterpart European Patent Application No. 10845268.1 (3pp).

*Primary Examiner* — Robert Beausoliel, Jr.
*Assistant Examiner* — Nicholas Allen
(74) *Attorney, Agent, or Firm* — Arent Fox LLP

(57) ABSTRACT

Provided is a navigation device wherein when a first and a second character string are input (STEP 1), a search category to which the first character string pertains and to which the second character string pertains are recognized (STEP 2); each of combination patterns of the first and the second search category is assigned with a priority score (STEP 3, 4); a weighting is applied to the priority score of a combinations pattern related to a search item composed of a first search character string including the first character string and a second search character string including the second character string according to a distance from a self vehicle to a geographic area specified by the first or the second search character string (STEP 5); and a facility as a destination candidate in order from a search item having a higher priority is searched (STEP 6 to STEP 10).

4 Claims, 3 Drawing Sheets

(56) References Cited

U.S. PATENT DOCUMENTS

| | | | |
|---|---|---|---|
| 2009/0307259 A1* | 12/2009 | Tischer | 707/102 |
| 2010/0049696 A1* | 2/2010 | Lokshin et al. | 707/3 |
| 2010/0211566 A1* | 8/2010 | Ghanekar et al. | 707/724 |
| 2010/0241507 A1* | 9/2010 | Quinn et al. | 705/14.42 |

FOREIGN PATENT DOCUMENTS

| | | |
|---|---|---|
| JP | 2007-026104 A | 2/2007 |
| JP | 2007-148559 A | 6/2007 |
| JP | 2009-054133 A | 3/2009 |
| JP | 2009-258805 A | 11/2009 |

\* cited by examiner

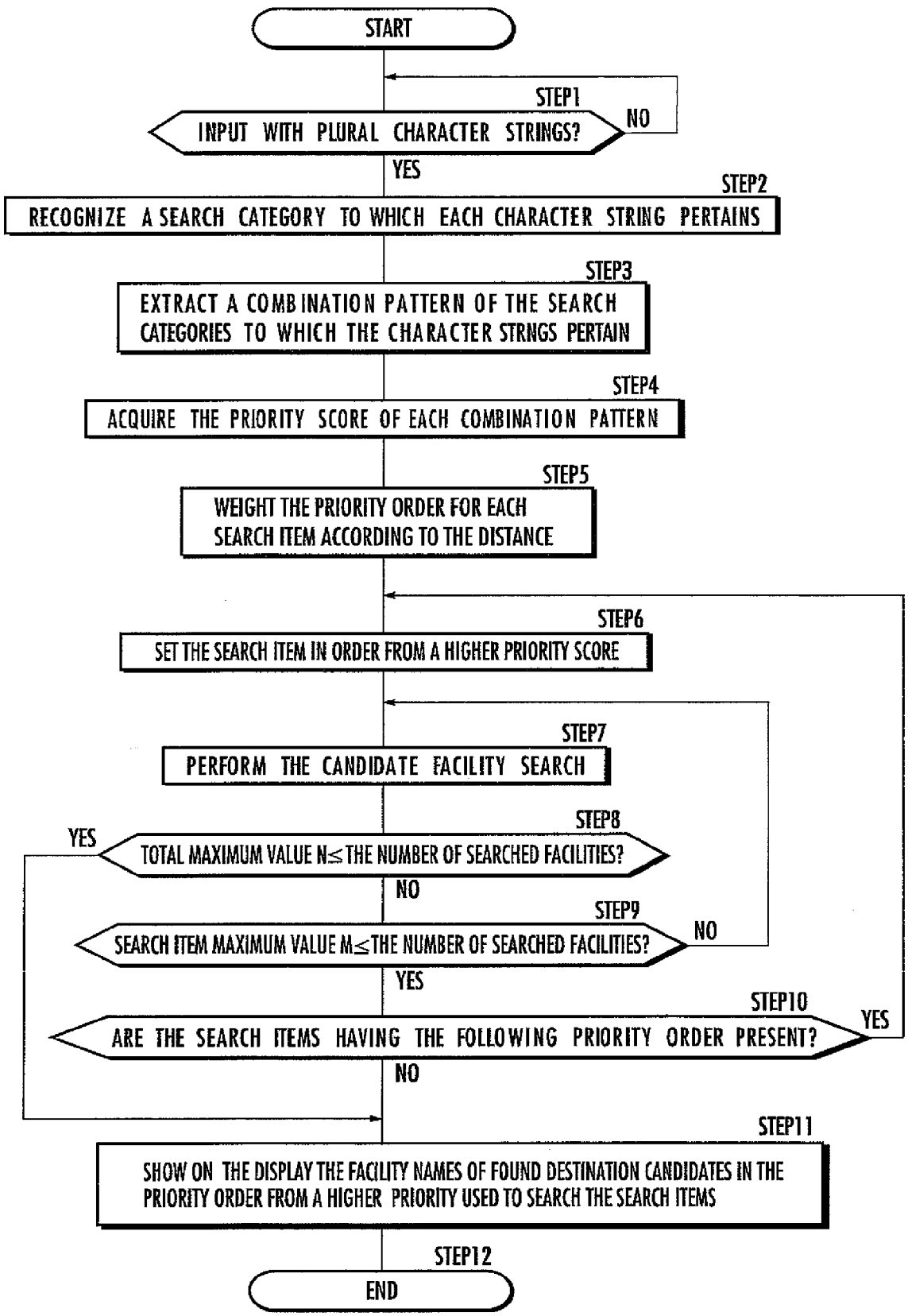

FIG.3

| COMBINATION OF SEARCH CATEGORIES | FIRST CHARACTER STRING (AOYAMA) | SECOND CHARACTER STRING (NOODLE) | PRIORITY SCORE |
|---|---|---|---|
| PATTERN 1 | AREA NAME | FACILITY GENRE | M1 |
| PATTERN 2 | STATION NAME | FACILITY GENRE | M2 |
| PATTERN 3 | FACILITY NAME | FACILITY NAME | M3 |
| PATTERN 4 | AREA NAME | FACILITY NAME | M4 |
| PATTERN 5 | STATION NAME | FACILITY NAME | M5 |
| PATTERN 6 | FACILITY NAME | FACILITY GENRE | M6 |

FIG.4

| | SEARCH ITEMS | COMBINATION PATTERN | DISTANCE | PRIORITY SCORE |
|---|---|---|---|---|
| 1 | SEARCH "NOODLE" SHOPS AROUND "MINAMI AOYAMA" | AREA NAME / FACILITY GENRE (SCORE: M1) | D1 (SCORE: D1) | M1+D1 |
| 2 | SEARCH "NOODLE" SHOPS AROUND "KITA AOYAMA" | AREA NAME / FACILITY GENRE (SCORE: M1) | D2 (SCORE: D2) | M1+D2 |
| 3 | SEARCH "NOODLE" SHOPS AROUND "AOYAMA STATION" | STATION NAME / FACILITY GENRE (SCORE: M2) | D3 (SCORE: D3) | M2+D3 |
| 4 | SEARCH FACILITY NAMES CONTAINING THE CHARACTER STRINGS OF "AOYAMA" AND "NOODLE" | FACILITY NAME (SCORE: M3) | * | M3 |
| 5 | SEARCH FACILITY NAMES CONTAINING "NOODLE" AROUND "MINAMI AOYAMA" | AREA NAME / FACILITY NAME (SCORE: M4) | D1 (SCORE: D1) | M4+D1 |
| 6 | SEARCH FACILITY NAMES CONTAINING "NOODLE" AROUND "KITA AOYAMA" | AREA NAME / FACILITY NAME (SCORE: M4) | D2 (SCORE: D2) | M4+D2 |
| 7 | SEARCH FACILITY NAMES CONTAINING "NOODLE" AROUND "AOYAMA STATION" | AREA NAME / FACILITY NAME (SCORE: M5) | D3 (SCORE: D3) | M5+D3 | though
NAVIGATION DEVICE

CROSS-REFERENCE TO RELATED APPLICATION

This Application is a National Stage entry of International Application No. PCT/JP2010/072542, having an international filing date of Dec. 15, 2010; which claims priority to Japanese Application No.: 2010-025906, filed Feb. 8, 2010; the disclosure of each of which is hereby incorporated in its entirety by reference.

TECHNICAL FIELD

The present invention relates to a navigation device which provides an information of a route to a destination.

BACKGROUND ART

For example, a navigation device installed in a vehicle (car navigation device) searches a route to a facility set by a driver as a destination on the basis of positioning information which is received from a GPS (Global Positioning System) satellite and a database of map information and facility information which is stored in a storage medium such as a HDD, a DVD or the like, and shows on a display a found route.

To set the destination, the driver selects one search category from a selection menu of a plurality of search categories (address, facility name, phone number, facility genre and the like) listed on the display and searches the database by using a character string as a search key for the selected search category (for example, refer to Patent Document 1).

CITATION LIST

Patent Documents

Patent document 1: Japanese Patent Laid-open No. 2007-148559

SUMMARY OF INVENTION

Technical Problem

As mentioned above, in the case of searching a destination by selecting one search category from a plurality of search categories, sometimes it is necessary to input another search key pertained to the other search category so as to refine the destination. For example, in the case of searching a noodle shop in city A, firstly, the driver selects the address as a search category to search city A, and then selects the facility genre as a search category to search the noodle shops in city A. In this way, it is disadvantageous that the search operation becomes troublesome and it costs time to set the destination.

The present invention has been accomplished in view of the aforementioned problems, and it is therefore an object of the present invention to provide a navigation device enabling a destination to be set with ease and in a short time.

Solution to Problem

To attain the object described above, the present invention provides a navigation device comprising: a database unit accessible to a facility database having an information of a facility associated with a predetermined search category; a character input unit for inputting a character string; a facility searching unit configured to search a facility as a destination candidate from the facility database using a character string input from the character input unit as a search key; and a display unit configured to display the information of a facility found by the facility searching unit.

The facility searching unit is configured to recognize a search category to which a first character string pertains and a search category to which a second character string pertains with reference to the facility database when the first character string and the second character string are input from the character input unit, define a combination of patterns of any of a plurality of a first search categories if a plurality of the first search categories which are the search categories to which the first character string pertains are specified and a second search category which is the search category to which the second character string pertains and assign a priority order to each combination pattern, and perform a candidate facility searching process to search a facility as a destination candidate according to the priority order assigned to each combination pattern by performing a search with the first character string as a search key in the first search category and a search with the second character string as a search key in the second search category according to each combination pattern.

According to the present invention, a user can input the first character string and the second character string without paying attention to the search categories, and in response to the input, the facility is searched out by the facility searching unit as a destination candidate and the facility name thereof is displayed on the display unit. The search of a facility is performed by the facility searching unit according to the combination patterns of the first search category to which the first character string pertains and the second search category to which the second character string pertains, and each combination pattern is assigned with a priority order.

The facility searching unit performs the candidate facility searching process according to the priority order assigned to the combination patterns. Therefore, for example, by setting higher the priority order of a search category (area name, facility genre or the like) which is highly possible to be input by a user in general, it is possible to search firstly a facility highly desired by the user, and to display the name thereof on the display unit.

According to the present invention, since a facility can be searched as the destination candidate according to the priority order and is displayed on the display unit through an one-time operation of inputting the first character string and the second character string by the user, it is possible for the user to perform the selection operation of a destination with ease and in a short time.

In the present invention, the facility searching unit is configured to perform the candidate facility searching process in order from a combination pattern having a higher priority in the combination patterns, and terminate the candidate facility searching process if the number of found facilities serving as the destination candidates is equal to or greater than a predetermined number.

According to the present invention, the candidate facility searching process is prohibited from being performed according to a combination pattern which has a lower priority order and is assumed to be less possible to be selected by the user. Therefore, it is possible to prevent a useless facility name from being displayed on the display unit to annoy the user.

The present invention is further provided with a position detecting unit configured to detect a present position, wherein the facility searching unit is configured to extract a first search character string containing the first character string for the first search category and a second search character string containing the second character string for the second search category from the database and set search items by using the first search character string and the second search character string as item elements for each combination pattern, and assign the priority order which has been assigned to a corresponding combination pattern to each search item, and when the first search character string or the second search character string in the item elements is used in a search category related to geographic areas, weight the priority order higher if a distance from the present position to a geographic area specified by the first search character string or the second search character string is shorter, and perform the candidate facility searching process in order from the search item having a higher priority.

According to the present invention, the facility searching unit sets the search items by using the first search character string and the second search character string as item elements for each combination pattern and assigns the priority order which has been assigned to a corresponding combination pattern to each search item. Moreover, when the first search character string or the second search character string is used in a search category (for example, area name, station name or the like) related to geographic areas, the facility searching unit weights the priority order higher if a distance from the present position to a geographic area specified by the first search character string or the second search character string is shorter, and performs the candidate facility searching process in order from the search item having a higher priority. According thereto, a facility located in a short distance which is assumed to be highly possible to be selected by the user as a destination can be searched by priority; it is possible to improve the convenience for the user.

In the present invention, at least two among facility name, area name, station name, and facility genre are included in the search category.

According to the present invention, by setting the facility name, area name, station name and facility genre which are assumed to be highly possible to be input by the user as the search categories, it is expected that a facility can be found according to the user's demand.

BRIEF DESCRIPTION OF THE DRAWINGS

FIG. 2 is a flow chart illustrating a candidate facility searching process;
FIG. 3 is an explanatory diagram illustrating combination patterns of search categories;
and
FIG. 4 is an explanatory diagram illustrating a practical example of the candidate facility searching process.

DESCRIPTION OF EMBODIMENTS

Figure 1:
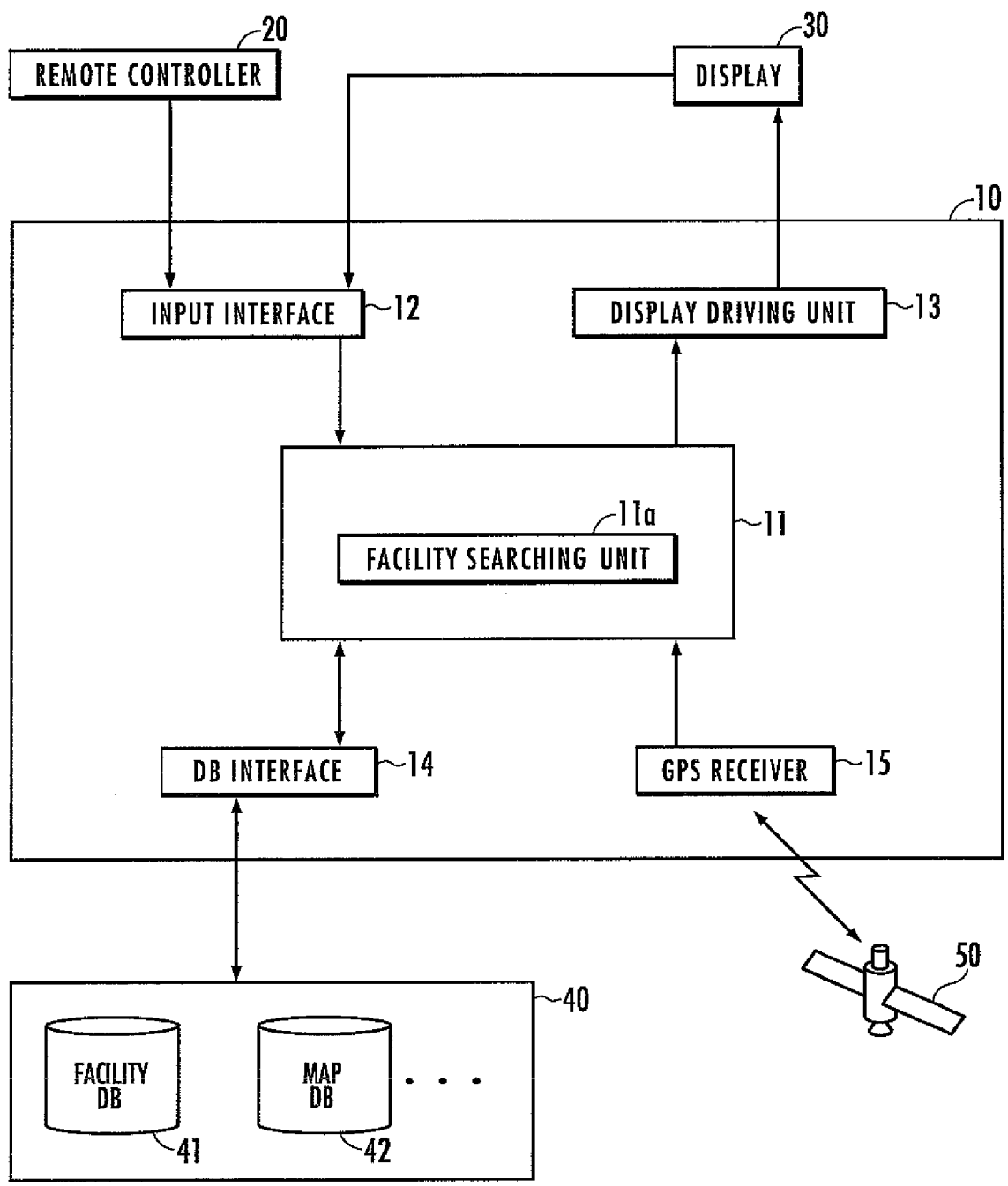
FIG. 1 is a structural diagram of a navigation device.

Hereinafter, an embodiment of the present invention will be described with reference to FIG. 1 to FIG. 4. With reference to FIG. 1, a navigation device according to the present embodiment is installed in a vehicle for use, and is composed of a navigation device main body 10, a remote controller 20, a display 30 (equivalent to the display unit of the present invention), and a storage device 40.

An occupant of the vehicle visually recognizes the display 30 to confirm a position or a moving course of a self vehicle. The display 30 is provided with a touch screen and the occupant can set a destination or the like by touching the touch screen. It is also possible for the occupant to set the destination or the like by manipulating the remote controller 20. The touch screen of the display 30 and the remote controller 20 are equivalent to the input unit of the present invention.

The navigation device main body 10 is an electronic unit composed of a microcomputer 11, a memory and the like. The navigation device main body is provided with an input interface 12 for inputting switch operation signals from the touch screen of the display 30 and the remote controller 20, a display driving unit 13 for outputting driving signals to the display 30, a DB interface 14 (equivalent to the database unit of the present invention) configured to access a facility database 41 and a map database 42 and the like stored in the storage device 40 and retrieve necessary data therefrom, and a GPS receiver 15 (equivalent to the position detecting unit of the present invention) configured to receive navigation waves output from a GPS (Global Positioning System) satellite 50 so as to detect the position of the self vehicle.

The microcomputer 11 functions as a facility searching unit 11a by executing a navigation device control program stored in a memory (not shown). When a character string (a character string for searching a destination) is input by the occupant of the vehicle according to the operations on the touch screen of the display 30 or the remote controller 20, the facility searching unit 11a uses the character string as a search key to search facilities as destination candidates from the facility database 41.

Thereafter, the facility searching unit 11a displays the names of found facilities on the display 30 and prompts the occupant to select a facility as the destination. After the facility is selected, the facility searching unit 11a searches a route to the selected facility with reference to the map database 42, and displays the found route on the display 30.

Hereinafter, with reference to the examples illustrated in FIG. 3 and FIG. 4, a process of searching a facility as a destination candidate (candidate facility searching process) by the facility searching unit 11a will be explained according to the flow chart illustrated in FIG. 2.

When a plurality of character strings are input at STEP 1, the facility searching unit 11a advances to STEP 2, and recognizes the search category to which each input character string pertains with reference to the facility database 41. In the present embodiment, "area name", "station name", "facility name" and "facility genre" are set as the search categories. Information of each facility registered in the facility database 41 is classified into the mentioned search categories and stored therein.

For example, when two character strings of "Aoyama" (first character string) and "noodle" (second character string) are input, the first character string of "Aoyama" pertains to three search categories of "area name, station name and facility name" (equivalent to the first search category of the present invention), and the second character string of "noodle" pertains to two search categories of "facility name and facility genre" (equivalent to the second search category of the present invention).

At the next STEP 3, the facility searching unit 11a extracts combination patterns of the search categories to which each character string pertains. In the case of "Aoyama" and "noodle", as illustrated in FIG. 3, the following six combination patterns of the search categories: pattern 1 (first character string—area name/second character string—facility genre), pattern 2 (first character string—station name/second character string—facility genre), pattern 3 (first character string—facility name/second character string—facility name), pattern 4 (first character string—area name/second character string—facility name), pattern 5 (first character string—station name/second character string—facility name), and pattern 6 (first character string—facility name/second character string—facility genre) are extracted.

At the next STEP 4, the facility searching unit 11*a* acquires priority scores of the extracted combination patterns. Here, as illustrated in FIG. 3, each combination pattern is assigned preliminarily with a priority order score from M1 to M6, and the priority order becomes higher in order of M6<M5<M4<M3<M2<M1.

At the subsequent STEP 5, the facility searching unit 11*a*, with regard to the search categories of each combination pattern, extracts from the facility database 41 a first search character string containing the first character string and a second search character string containing the second character string (the first search character string and the second search character string are included in the information of facilities registered in the facility database 41).

Then, the facility searching unit 11*a* sets search items with the extracted first search character string and second search character string served as item elements. As illustrated in FIG. 4, for the first character string of "Aoyama" and the second character string of "noodle", the following seven search items: search item 1 (area name: the first search character string—Minami Aoyama, facility genre: the second search character string—noodle), search item 2 (area name: the first search character string—Kita Aoyama, facility genre: the second search character string—noodle), search item 3 (station name: the first search character string—Aoyama station, facility genre: the second search character string—noodle), search item 4 (facility name: the first search character string—Aoyama, the second search character string—noodle), search item 5 (area name: the first search character string—Minami Aoyama, facility name: the second search character string—noodle), search item 6 (area name: the first search character string—Kita Aoyama, facility name: the second search character string—noodle), and search item 7 (station name: the first search character string—Aoyama station, facility name: the second search character string—noodle) are set.

Next, the facility searching unit 11*a* weights the priority score which has been assigned to a corresponding combination pattern according to the distance from the present position of the self vehicle for each search item. Specifically, when the first search character string and the second search character string are used in a search category related to geographic areas, the facility searching unit 11*a* adds a higher score to the score assigned to the corresponding combination pattern as the distance between the area specified by the first character string or the second character string and the self vehicle becomes shorter.

In the example of FIG. 4, the first search character strings "Minami Aoyama" (area name), "Kita Aoyama" (area name) and "Aoyama station" (station name) are set as the search category (area name and station name) for geographic areas, and the distance between the self vehicle and Minami Aoyama is d1, the distance between the self vehicle and Kita Aoyama is d2 and the distance between the self vehicle and Aoyama station is d3. Since the distance to the self vehicle becomes longer in order of d1<d2<d3, the scores D1 to D3 assigned to d1 to d3 becomes higher in a reverse order to the above order (D3<D2<D1).

With respect to the search items 1-3 and 5-7 with the first search character strings of "Minami Aoyama", "Kita Aoyama" and "Aoyama station" served as the search elements, the facility searching unit 11*a* adds the scores D1 to D3 related to the distances to the self vehicle to the priority scores M1, M2, M4 and M5 assigned to the corresponding combination patterns.

Thereby, as illustrated in FIG. 4, the priority score of M1+D1 is set for the search item 1, the priority score of M1+D2 is set for the search item 2, the priority score of M2+D3 is set for the search item 3, the priority score of M3 is set for the search item 4, the priority score of M4+D1 is set for the search item 5, the priority score of M4+D2 is set for the search item 6, and the priority score of M5+D3 is set for the search item 7.

At the next STEP 6, the facility searching unit 11*a* sets the search items in order from a search item of a higher priority score (having a higher priority order), and at STEP 7, the facility searching unit 11*a* performs the search in the first search category according to the first search character string and the search in the second search category according to the second search character string so as to search out a facility as the destination candidate from the facility database 41. At the subsequent STEP 8, if the number of found facilities by the facility searching unit 11*a* becomes equal to or greater than a total maximum value N, the process branches to STEP 11.

On the other hand, at STEP 8, if the number of found facilities is less than the total maximum value N, the process advances to STEP 9 where the facility searching unit 11*a* judges whether or not the number of found facilities according to the present search items is equal to or greater than a search item maximum value M. If the number of found facilities according to the present search items is equal to or greater than the search item maximum value M, the process advances to STEP 10; if the search item maximum value M is not reached, the process branches to STEP 7 to continue the search according to the present search items.

At STEP 10, the facility searching unit 11*a* judges the presence of a search item having a secondary priority order. If a search item having a secondary priority order is present, the process branches to STEP 6 where the facility searching unit 11*a* sets the first search character string and the second search character string according to the search item having a secondary priority order and performs the processing starting from STEP 7. On the other hand, at STEP 10, if a search item having a secondary priority order is absent (the search for all the search items is completed), the process advances to STEP 11.

At STEP 11, the facility searching unit 11*a* displays on the display 30 the names of found facilities according to the search items in order from the higher priority order and advances to STEP 12 to terminate the process. In the example of Table 4, when the priority scores increase (the priority orders increase) from the bottom of the table to the top thereof, the names of found facilities according to each search item are displayed on the display 30 in order from the top of the table, namely the search item 1 (priority score M1+D1), the search item 2 (priority score M1+D2), the search item 3 (M2+D3), . . . .

Here, the assignment of the priority order score to each combination pattern of the search categories illustrated in FIG. 3 is set in such a way that the priority score increases for a search category which is assumed to be highly possible to be input by the occupant. Therefore, it is possible to improve the possibility of finding a facility adequate to the user's need according to the input of the first character string and the second character string.

Further, as illustrated in FIG. 4, the facility searching unit 11*a* sets the search items with the first search character string containing the first character string and the second search character string containing the second character string as the search elements for the search categories according to each combination pattern, and weights the priority score higher as the distance between the geographic area specified by the first search character string or the second search character string and the self vehicle becomes shorter for the search items containing the first search character string or the second search character string related to the geographic areas to determine the priority order of each search item. Accordingly, it is possible to search efficiently a facility close to the self vehicle by priority which is highly possible to be demanded by the user.

In the present embodiment, if the number of found facilities becomes equal to or greater than the total maximum value N at STEP 8 of FIG. 2, the candidate facility searching process is terminated; and if the number of found facilities according to each search item becomes equal to or greater than the search item maximum value M at STEP 9, the process advances to the search according to a search item having a secondary priority order; however it is acceptable to search all the relevant facilities without performing the mentioned processes.

At STEP 10 of FIG. 2, the priority order is weighted according to the distance from a geographic area (area name, station name) of the search category to the self vehicle; however, without performing such weighting, it is possible to obtain the effects of the present invention.

In the present embodiment, "area name, station name, facility name and facility genre" are illustrated as the search categories for the input character strings; however, it is acceptable to adopt the other search categories or have additional search categories supplemented.

In the present embodiment, it is described that a facility is searched in a case where two character strings (the first character string and the second character string) are input; however, in a case where three character strings or more are input, it is possible to perform the same facility searching by assigning the priority scores to the combination patterns of search categories to which each character string pertains.

In the present embodiment, a navigation device disposed in a vehicle is described; however, the present invention is applicable to a portable navigation device carried by a pedestrian.

INDUSTRIAL APPLICABILITY

As mentioned above, according to the navigation device of the present invention, the setting of a destination can be performed with ease and in a short time to enable the search of the destination desired by an occupant of a vehicle, it is usable in providing information of a route to the destination.

DESCRIPTION OF REFERENCE NUMERALS

10: navigation device main body; 11: microcomputer; 11*a*: facility searching unit; 12: input interface; 14: DB interface; 40: storage device; 41: facility database.

The invention claimed is:

1. A navigation device comprising:
a database unit configured to access a facility database having information of a facility associated with a predetermined search category;
a character input unit configured to input a character string;
a facility searching unit configured to search a facility as a destination candidate from the facility database using the character string input from the character input unit as a search key; and
a display unit configured to display the information of a facility found by the facility searching unit,
wherein the facility searching unit is configured to:
recognize a plurality of first search categories to which a first character string pertains and a plurality of second search categories to which a second character string pertains with reference to the facility database when the first character string and the second character string are input from the character input unit,
define a combination of patterns of the plurality of first search categories to which the first character string pertains and the plurality of second search categories to which the second character string pertains, and assign a priority order to each of the combination of patterns, and
perform a candidate facility searching process to search a facility as a destination candidate according to the priority order assigned to each of the combination of patterns by performing a first search with the first character string as a first search key in the plurality of first search categories and a second search with the second character string as a second search key in the plurality of second search categories according to each of the combination of patterns.

2. The navigation device according to claim 1, wherein the facility searching unit is configured to perform the candidate facility searching process in order from a combination pattern assigned with a higher priority in the combination patterns, and terminate the candidate facility searching process if the number of found facilities serving as the destination candidates is equal to or greater than a predetermined number.

3. The navigation device according to claim 1 is further provided with a position detecting unit configured to detect a present position,
wherein the facility searching unit is configured to:
extract a first search character string containing the first character string for the plurality of first search categories and a second search character string containing the second character string for the plurality of second search categories from the database and set search items by using the first search character string and the second search character string as item elements for each of the combination patterns,
assign the priority order which has been assigned to a corresponding combination pattern to each search item, and when the first search character string or the second search character string in the item elements is used in a search category related to geographic areas, weight the priority order higher if a distance from the present position to a geographic area specified by the first search character string or the second search character string is shorter, and
perform the candidate facility searching process in order from the search item having a higher priority.

4. The navigation device according to claim 1, wherein at least two of a facility name, an area name, a station name, and a facility genre are included in the plurality of search categories.

\* \* \* \* \*